(12) United States Patent
Gunderson et al.

(10) Patent No.: US 6,642,839 B1
(45) Date of Patent: Nov. 4, 2003

(54) SYSTEM AND METHOD OF PROVIDING SCALABLE SENSOR SYSTEMS BASED ON STAND ALONE SENSOR MODULES

(75) Inventors: Richard A. Gunderson, Eden Prairie, MN (US); David Thiede, Eden Prairie, MN (US); Michael A. Parisi, Doylestown, PA (US); R. Jeffrey Nelson, Huntingdon Valley, PA (US)

(73) Assignee: Altra Technologies Incorporated, Watertown, MN (US)

( * ) Notice: Subject to any disclaimer, the term of this patent is extended or adjusted under 35 U.S.C. 154(b) by 0 days.

(21) Appl. No.: 09/505,418

(22) Filed: Feb. 16, 2000

(51) Int. Cl.⁷ .................................................. B60Q 1/00
(52) U.S. Cl. ........................ 340/435; 340/436; 340/903; 340/904; 340/461; 364/424.04
(58) Field of Search ............................... 340/435, 436, 340/903, 904, 461; 364/424.04

(56) References Cited

U.S. PATENT DOCUMENTS

| | | | |
|---|---|---|---|
| 3,707,708 A | 12/1972 | Dan ........................ 340/213.2 |
| 3,797,309 A | 3/1974 | Joy et al. .................... 73/194 B |
| 3,891,966 A | 6/1975 | Sztankay ..................... 340/53 |
| 3,978,481 A | 8/1976 | Angwin et al. .......... 343/7 VM |
| 4,056,761 A | 11/1977 | Jacoby et al. ............... 318/116 |
| 4,072,945 A | 2/1978 | Katsumata et al. ...... 343/7 VM |
| 4,104,632 A | 8/1978 | Fujiki et al. ............. 343/7 VM |
| 4,125,826 A | 11/1978 | Rasmussen et al. .......... 340/63 |
| 4,146,891 A | 3/1979 | Fujiki et al. ............ 343/77 VM |
| 4,148,028 A | 4/1979 | Fujiki ............................ 343/7 |
| 4,158,841 A | 6/1979 | Wuchner et al. ......... 343/7 VM |
| 4,162,488 A | 7/1979 | Silverman et al. .......... 340/505 |
| 4,204,096 A | 5/1980 | Barcus et al. ........... 179/146 R |
| 4,308,536 A | 12/1981 | Sims, Jr. et al. ......... 343/7 VM |
| 4,379,497 A | 4/1983 | Hainsworth et al. ........ 180/168 |
| RE31,509 E | 1/1984 | Neidell ....................... 343/9 R |
| 4,489,321 A | 12/1984 | Hoffa et al. .................... 343/8 |
| 4,528,563 A * | 7/1985 | Takeuchi ..................... 340/903 |
| 4,537,271 A | 8/1985 | Ito et al. ...................... 180/131 |
| 4,546,840 A | 10/1985 | Yukishige et al. .......... 180/169 |
| 4,580,251 A | 4/1986 | Koukovinis .................. 367/140 |
| 4,612,530 A | 9/1986 | Kurth .......................... 340/63 |

(List continued on next page.)

FOREIGN PATENT DOCUMENTS

| | | | |
|---|---|---|---|
| DE | 19702688 | 7/1998 | |
| EP | 0909959 A2 | 4/1999 | .......... G01S/13/93 |
| WO | 95/01890 | 1/1995 | ............ B60Q/1/00 |
| WO | 99/42856 | 8/1999 | .......... G01S/13/93 |

OTHER PUBLICATIONS

Blackman, S.S., *Multiple—Target Tracking with Radar Applications*, Artech House, Inc., Norwood, MA, pp. 98–107, 280–299, (1986).
Blind–Sight Product Brochure, (May 7, 1996).
Sonar Safety Systems Product, (1996).
ECCO SCAN Product Literature, (1996).
"Driver's Manual for the CL–400 Reverse Parking Aid", *TICI Software Systems Ltd. and Silcon Heights Ltd.*, In: Rechovot, Israel, 1–9, (Jun., 1997).
Benites, E., "A Demonstration of Multisensor Tracking", *Naval Weapons Center*, China Lake, CA, 307–311.

*Primary Examiner*—Daniel J. Wu
*Assistant Examiner*—Tai T. Nguyen
(74) *Attorney, Agent, or Firm*—Schwegman, Lundberg, Woessner & Kluth, P.A.

(57) ABSTRACT

A stand alone sensor module having built in intelligence that provides object detection for a both a vehicle and stationary applications. The system includes a processor connected to a sensor and a signal interface. The processor receives signals from the sensor and the signal interface and generates a status signal based on the signals received from the sensor and the signal interface. The processor drives the status signal to the signal interface.

20 Claims, 16 Drawing Sheets

U.S. PATENT DOCUMENTS

| | | | |
|---|---|---|---|
| 4,679,175 A | 7/1987 | Eder et al. ..................... 367/98 |
| 4,681,431 A | 7/1987 | Sims et al. ..................... 356/4 |
| 4,692,764 A | 9/1987 | Bonar ........................ 342/71 |
| 4,737,788 A | 4/1988 | Kennedy ..................... 342/29 |
| 4,759,063 A | 7/1988 | Chaum ........................ 380/30 |
| 4,759,064 A | 7/1988 | Chaum ........................ 380/30 |
| 4,815,046 A | 3/1989 | Dorr ......................... 367/95 |
| 4,823,042 A | 4/1989 | Coffey et al. ............... 310/322 |
| 4,920,520 A | 4/1990 | Gobel et al. ................. 367/99 |
| 4,943,796 A | 7/1990 | Lee ........................... 340/435 |
| 4,953,141 A | 8/1990 | Novak et al. ............... 367/108 |
| 5,029,290 A | 7/1991 | Parsons et al. ............. 340/533 |
| 5,059,946 A | 10/1991 | Hollowbush ................ 340/435 |
| 5,091,726 A * | 2/1992 | Shyu ......................... 340/904 |
| 5,153,559 A | 10/1992 | Atsumi ....................... 340/435 |
| 5,181,011 A | 1/1993 | Okano ........................ 340/438 |
| 5,212,467 A | 5/1993 | Park et al. ................... 340/435 |
| 5,229,975 A | 7/1993 | Truesdell et al. ........... 367/107 |
| 5,235,316 A | 8/1993 | Qualizza .................... 340/436 |
| 5,249,163 A | 9/1993 | Erickson .................... 367/149 |
| 5,251,188 A | 10/1993 | Parsons et al. ............. 367/140 |
| 5,286,099 A | 2/1994 | Fujita et al. ................. 303/103 |
| RE34,773 E | 11/1994 | Dombrowski ............... 340/904 |
| 5,373,482 A | 12/1994 | Gauthier ..................... 367/99 |
| 5,389,912 A | 2/1995 | Arvin ......................... 340/435 |
| 5,418,359 A | 5/1995 | Juds et al. .................. 250/221 |
| 5,424,747 A | 6/1995 | Chazelas et al. ............. 342/70 |
| 5,455,557 A | 10/1995 | Noll et al. ................... 340/431 |
| 5,465,079 A | 11/1995 | Bouchard et al. ........... 340/576 |
| 5,471,215 A | 11/1995 | Fukuhara .................... 342/70 |
| 5,483,501 A | 1/1996 | Park et al. ................... 367/140 |
| 5,485,892 A | 1/1996 | Fujita ........................ 180/167 |
| 5,517,197 A | 5/1996 | Algeo et al. .................. 342/70 |
| 5,541,891 A | 7/1996 | Waldmann et al. ........... 367/99 |
| 5,572,428 A | 11/1996 | Ishida et al. ................. 364/461 |
| 5,574,426 A * | 11/1996 | Shisgal et al. .............. 340/435 |
| 5,581,464 A * | 12/1996 | Woll et al. ............. 364/424.04 |
| 5,583,479 A | 12/1996 | Hettich et al. ............... 340/426 |
| 5,587,938 A | 12/1996 | Hoetzel ...................... 364/578 |
| 5,635,922 A | 6/1997 | Cho et al. .................... 340/903 |
| 5,668,739 A * | 9/1997 | League et al. .............. 382/103 |
| 5,670,935 A * | 9/1997 | Schofield et al. ........... 340/461 |
| 5,684,474 A * | 11/1997 | Gilon et al. ................. 340/903 |
| 5,712,640 A | 1/1998 | Andou et al. ................. 342/70 |
| 5,714,928 A * | 2/1998 | Sudo et al. .................. 340/436 |
| 5,714,947 A | 2/1998 | Richardson et al. ......... 340/903 |
| 5,734,336 A * | 3/1998 | Smithline .................... 340/903 |
| 5,749,984 A | 5/1998 | Frey et al. ................... 152/415 |
| 5,767,793 A * | 6/1998 | Agravante et al. .......... 340/903 |
| 5,917,666 A | 6/1999 | Kimble ........................ 359/838 |
| 5,929,786 A | 7/1999 | Schofield et al. ........... 340/903 |
| 6,154,149 A | 11/2000 | Tyckowski et al. ........... 340/903 |
| 6,198,409 B1 | 3/2001 | Schofield et al. ........... 340/903 |
| 6,250,783 B1 | 6/2001 | Stidham et al. ............. 362/494 |

\* cited by examiner

SYSTEM AND METHOD OF PROVIDING SCALABLE SENSOR SYSTEMS BASED ON STAND ALONE SENSOR MODULES

BACKGROUND OF THE INVENTION

1. Field of the Invention

The present invention is related to collision avoidance systems, and more particularly to a stand alone sensor system with built in intelligence.

2. Background Information

The roadways are becoming more and more congested with vehicular traffic. As traffic congestion has increased, the number of accidents has also increased. Some of these accidents can be traced to driver inattentiveness or to the failure of the driver to see another vehicle. Many accidents on the road are caused when drivers are changing lanes. The driver is unable to clearly see if another vehicle is either directly in or entering the lane to the right or left side of their vehicle. This is particularly true for large vehicles such as busses, vans, trucks, tractor trailer rigs, motor homes and vehicles towing trailers.

Accidents are also caused when backing a vehicle. The ability to see behind and around a vehicle while backing up is limited and even more limited the larger and less transparent the vehicle being backed up is. Not only is this true for professional drivers such as truck drivers and bus drivers but this is true for nonprofessional individuals driving moving vans, towing recreational items such as boat trailers, ski mobile trailers, storage trailers or driving recreational vehicles such as campers and motor homes. Potential hazards when backing a vehicle include stationary and moving objects, posts, vehicles, pedestrians (in particular children), people on skateboards, roller blades and bicycles that are in or move into the path of the moving vehicle.

Systems for warning drivers of objects external to their vehicle have been around for a long time. Mirrors, and sometimes combinations of mirrors, are being used to reveal locations hidden to the driver's view (i.e. "blind spots"). Mirrors, however, have a deficiency in that the driver can only look in one spot at any one time. If they look behind the vehicle, see that the way is clear, start looking elsewhere and then a vehicle pulls behind them, they won't see it and may back into the vehicle. In addition, mirrors don't work well when changing lanes. If a driver looks at the lane adjacent to the vehicle and sees that the way is clear then starts looking elsewhere and a vehicle pulls along side them, they won't see it and may clip the vehicle while changing lanes. With tractor-trailer rigs, as soon as the rig begins to turn, the mirror that looked down along the side of the vehicle is directed into the side of the trailer and the driver is blinded to activity on that side of his truck. What is needed is a collision avoidance system to alert drivers of vehicles or objects within their path for a variety of applications.

There are also problems with vehicle detection in stationary situations such as work zones. Work zone areas may be along or on roadways or highways. The lanes often narrow in the work zone area and construction workers are working in close proximity to the traffic. Work zones call for the reduction of speed limits. Currently stationary warning signs and individuals signaling the traffic to stop or slow down are not able to adjust for changing conditions within the work zone. For example heavy-duty vehicles, such as dump trucks, entering the roadway at the work zone, often traveling at slow speeds, pose additional hazards. The narrowing of the roadway, the high speed of drivers approaching the roadway, the proximity of construction workers, and the movement of construction vehicles in the vicinity of the work zone present hazardous conditions that often result in accidents and fatalities. What is needed is a warning system that dynamically adjusts the situation.

The current collision avoidance systems are either designed as multiple sensor systems having central intelligence through an on board computer or as single sensors with no built-in intelligence. These systems are inflexible as they are designed to provide detection for a predetermined application and are not situation specific for each user. For example, a bus driver may find that the area under the front wheels is the most dangerous and would like an object detection system for that specific location. A snow plow driver has a need for detection of vehicles approaching too fast from behind. A truck driver requires rear object detection for backing into delivery bays. The current detection systems are not flexible enough to meet all of these needs cost effectively. The current systems are also inflexible for independent truck drivers who own a tractor and transport a variety of customer's trailers. The current detection systems are not interoperable. An individual truck driver having a tractor with one on board computer system is not necessarily able to interface with the collision avoidance system available on each customer's trailer. In addition, many of the trailers are not equipped with any detection devices and the truck driver is left with no collision avoidance capability. What is needed is a flexible object detection system capable of meeting a diversity of drivers needs that provides a common interface for a variety of detection systems.

In addition, most of the current collision avoidance systems are expensive and are not considered cost effective for many trucking companies and independent truckers and are considered cost prohibitive for non-professional drivers. The systems are not flexible enough to allow the user to add or remove sensors as required for their particular application. Additional sensors for many systems cause the whole system to be redesigned at a high cost to the user.

SUMMARY OF THE INVENTION

The above mentioned problems with collision avoidance and detection systems and other problems are addressed by the present invention and will be understood by reading and studying the following specification.

According to one aspect of the invention, a stand alone sensor module, that detects objects about a vehicle or a stationary location, is provided. The sensor module includes a processor connected to a sensor and a signal interface and receives signals from the sensor and the signal interface. The processor generates a hazard status signal as a function of the signals received from the sensor and the signal interface and drives the vehicle status signal to the signal interface.

According to another aspect of the invention, a stand alone sensor module is provided. The sensor module includes a processor connected to a sensor and a signal interface and receives signals from the sensor and the signal interface. The processor generates a vehicle status signal as a function of the signals received from the sensor and the signal interface and drives the vehicle status signal to the signal interface.

Further, according to another aspect of the invention a collision avoidance system is provided. The collision avoidance system includes a first stand alone sensor module connected to a second stand alone sensor module and a display module coupled to both the first and second sensor modules. The first stand alone sensor module includes a first sensor coupled to a first processor. The first processor is connected to a first signal interface. The first processor receives signals from the first sensor and the first signal interface and drives a first vehicle status signal to the first signal interface as a function of the signals received from the first sensor and first signal interface. The second stand alone sensor module includes a second sensor coupled to a second processor. The second processor is connected to a second signal interface. The second processor receives signals from the second sensor and the second signal interface and drives a second vehicle status signal to the second signal interface as a function of the signals received from the second sensor and second signal interface. The display module receives the first and second vehicle status signals and displays vehicle status information representative of the first and second vehicle status signals.

A method of detecting an object with a stand alone sensor module is provided. The method includes receiving vehicle condition signals, transmitting a detection signal and receiving a return of the transmitted detection signal. The method further includes determining whether a hazard exists based on the return of the transmitted detection signal and the vehicle condition signals and transmitting a vehicle status signal to an information device.

BRIEF DESCRIPTION OF THE DRAWINGS

In the following drawings, where the same number reflects similar function in each of the drawings.

DESCRIPTION OF THE PREFERRED EMBODIMENTS

In the following detailed description of the preferred embodiments, reference is made to the accompanying drawings that form a part hereof, and in that is shown by way of illustration specific embodiments in that the invention may be practiced. It is to be understood that other embodiments may be utilized and structural changes may be made without departing from the scope of the present invention. The following detailed description is, therefore, not to be taken in a limiting sense.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
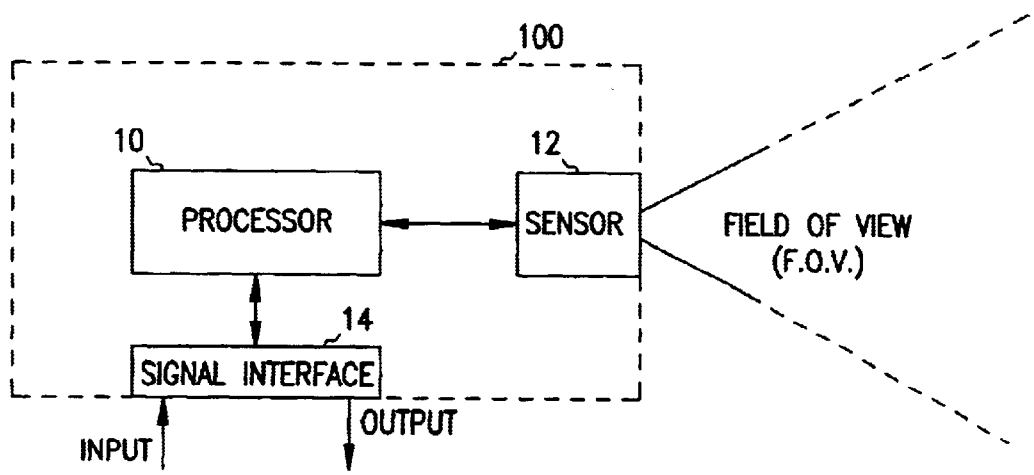
FIG. 1 is a block diagram of one embodiment of a stand alone sensor module according to the teachings of the present invention.

FIG. 1 is a block diagram of one embodiment of a stand alone sensor module indicated generally at 100, including a processor 10 connected to a sensor 12. The a stand alone sensor module 100 includes input and outputs that are coupled to the module 100 through a signal interface 14.

Signal interface 14 receives input signals and provides a means to output signals to one or more information devices such as a display module, a centralized computer system, a collision avoidance system, sensors, a data recorder such as a black box data recorder, a satellite tracking system and/or a warning system and the like. It is understood that the signal interface provides a means to output signals to any number of devices and is not limited by the information devices listed above. In one embodiment, the information devices are wirelessly coupled to a stand alone sensor module 100.

In one embodiment, the a stand alone sensor module 100 is employed on a vehicle. Input signals that contain vehicle conditions are received from vehicle systems such as the vehicle's engine electronics or electronic control module, transmission, lighting systems, safety systems, trailer electronics, a centralized computer system and any number of vehicle monitoring systems as well as other sensor systems. The input signals are analog and/or digital signals. The vehicle conditions include information such as whether or not the vehicle is in park, reverse or drive, whether or not the brakes or parking brakes are engaged, the speed of the vehicle, whether or not a directional is engaged, that another vehicle is approaching and at what speed and the like. As an example, vehicle speed information may be received by a stand alone sensor module 100 from any number of sources to include the electronic control module, sensors built into a transmission, a radar sensor used to detect vehicle speed, and inputs from a sensor built into a trailer. In addition, vehicle direction can be determined by a stand alone sensor module 100 when receiving vehicle condition inputs from a transmission reverse switch, a manual activation of a flasher system by an operator or driver, or any number of devices indicating or sensing vehicle movement.

In one embodiment, the signal interface 14 is a data bus that is compatible with communication systems to include centralized communication systems and satellite positioning systems used on vehicles in the trucking industry, bus lines or the like. In one embodiment, the signal interface is an SAE J1708 data bus, currently a standard data bus for large vehicles. In another embodiment, the signal interface is an SAE J1939 data bus, another standard data bus for large vehicles. In one embodiment, a stand alone sensor module 100 is used with any variety of vehicles having any number of communication interfaces and/or information devices. In another embodiment, stand alone sensor module 100 provides output to one or more information devices mounted in or on vehicle. In an alternate embodiment, stand alone sensor module 100 provides output to one or more information devices outside of the vehicle. In a further embodiment, stand alone sensor module 100 provides output to one or more information devices mounted in or on a vehicle and outside of the vehicle.

In another embodiment, the a stand alone sensor module 100 is employed in a stationary environment such as a work zone. Input signals that contain hazard conditions are received from other sensors or information devices within or outside of the work zone environment. The input signals are analog and/or digital signals. The hazard conditions include information such as a vehicle is approaching the work zone and at what speed, a vehicle is approaching the road in preparation for entering the roadway, people are working close to the traffic in a work zone and the like Processor 10 communicates with sensor 12, receiving inputs, that include signal data from sensor 12, and sending commands to sensor 12. In one embodiment, processor 10 receives input signals from additional sensors. The additional sensors include a stand alone sensor modules, slave sensors and other detection sensors. In one embodiment, a slave sensor includes a transmitter and receiver and transmits and receives signals to detect objects within its signal path or field-of-view, FOV. In one embodiment, the transmitter and receiver are contained in a single housing. In another embodiment the transmitter and receiver are contained in separate housings. In an alternate embodiment, a slave sensor includes a transmitter, receiver, an antenna and electronics for transmitting, receiving signals and further transmission of received signals electrically or wirelessly. It is understood that a slave sensor is not limited to a transmitter and receiver and may include additional electronics for various detection technologies i.e. laser, laser radar (ladar), ultrasonic, radar, video, infra red, photoelectric and the like.

Sensor 12 transmits and receives signals in order to detect any objects within the proximity of a host vehicle or within or outside a work zone area. The sensor has a field-of-view, FOV, as shown in FIG. 1, the FOV is the area in which the sensor transmits and receives signals. Objects within the FOV are sensed and signals are transmitted by sensor 12 to processor 10. Road noise and other interference signals are filtered out so as not to produce false alarms.

Processor 10 receives signal data and vehicle or hazard condition information and generates status information. In one embodiment, processor 10 generates vehicle status information. Vehicle status information includes the presence of a hazard such as an object is within the path of the vehicle, an object has moved into the path of the vehicle while backing up, an object is detected under the wheels, the vehicle does not have enough clearance to pass under a sign or an overpass, another vehicle is approaching too quickly and the like. Vehicle status information also includes the absence of a hazard such as no hazard has been detected, all sensors are functioning, some sensors are functioning and the like. In one embodiment, processor 10 generates hazard status information. Hazard status information includes for example a vehicle is approaching a work zone too quickly, a vehicle is approaching the work zone when another vehicle is entering the roadway, people are working close to the traffic in a work zone, no hazard has been detected, all sensors are functioning, some sensors are functioning and the like.

Processor 10 determines whether or not detected objects present a hazard and transmits the results to an information device. Processor 10 dynamically adjusts based on information received. For example, a stand alone sensor module can be pre-programmed to detect objects as a hazard when a directional has been engaged and an object is within 10 feet of the side of the vehicle or when the vehicle is backing up the threshold for side object detection may be programmed at 4 feet or some other value. It is to be understood that distance from the vehicle or sensor determined as a hazard may vary from one application to another application. Processor 10 is capable of receiving information from a number of sensors and determining if a hazard exists, the sensors include stand alone sensor modules, slaves or other detection sensors. The field-of-view for a stand alone sensor module is expandable by connecting slave sensors to the stand alone sensor module. The slave sensors provide information to processor 10, processor 10 uses the information to determine whether or not a hazard exists based on the current vehicle or hazard conditions. The stand alone sensor module is a scalable system by adding additional stand alone sensor modules, slave sensors or other detection sensors. In one embodiment, stand alone sensor module 100 allows for the addition of multiple stand alone sensor modules to provide partial or full periphery monitoring of areas around a vehicle with the ability to provide the vehicle driver with information pertinent to all hazards in any location around the vehicle. In one embodiment, stand alone sensor module 100 allows for the addition of multiple stand alone sensor modules to provide partial or full periphery monitoring of a location in and around a work zone or other areas needing monitoring with the ability to provide pertinent hazard information to individuals within the work zone or approaching the work zone. Status information received In one embodiment, a built-in-test capability is provided. Stand alone sensor module 100 determines if it is functional or not, if sensors coupled to stand alone sensor module 100 are functional or not and if signal data is being received from sensors connected to stand alone sensor module 100. This information is then communicated to any number of information devices in order to communicate a failure if it is not performing properly, or to communicate a success if it is performing properly. In one embodiment, a self-test mode is activated. A display or control module is provided which provides an indicator for each sensor mounted around the vehicle and on entering self-test mode sensor indicators begin to flash. So now what the driver can do is get out and literally walk around his vehicle, get back in the cab. Every one of those sensors should have detected him and every time they detect him, the sensor indicator associated with the sensor goes off (i.e., quits flashing). If the driver gets back to the cab and there's an indicator still flashing, he knows that something didn't work and he's got a problem.

In one embodiment, stand alone sensor module 100 includes sensor 12 having a single sensor such as an ultrasonic sensor, a radar sensor, a laser radar or ladar sensor, an infrared sensor or the like. In another embodiment, stand alone sensor module 100 includes sensor 12 having two or more sensors employing similar or different technologies, radar, ultrasonic, ladar, infrared and the like. For example in one embodiment, stand alone sensor module 100 includes sensor 12 having a radar sensor and an ultrasonic sensor. However, the present invention is not limited to ultrasonic and radar detection technologies and may include any variety of detection technologies such as photoelectric, video, laser, ladar and/or infrared.

Figure 2:
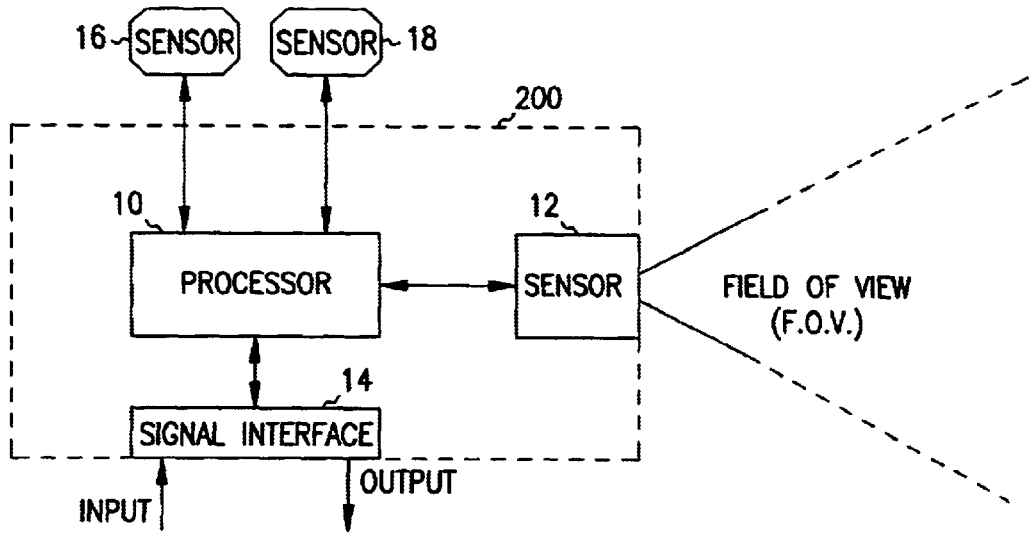
FIG. 2 is a block diagram of another embodiment of a stand alone sensor module according to the teachings of the present invention.

FIG. 2 illustrates a stand alone sensor module 200 with a sensor 12, a signal interface 14 and a processor 10. Processor 10 is connected to sensor 12, signal interface 14 and two additional sensors 16 and 18. In one embodiment, sensors 16 and 18 are slave sensors. In an alternate embodiment, sensors 16 and 18 are stand alone sensor modules. In a further embodiment, sensors 16 and 18 are any combination of slave sensors, stand alone sensor modules or other sensors that receive and transmit signals to detect objects within their FOV In another embodiment, sensors 16 and 18 are wirelessly connected to processor 10.

Figure 3:
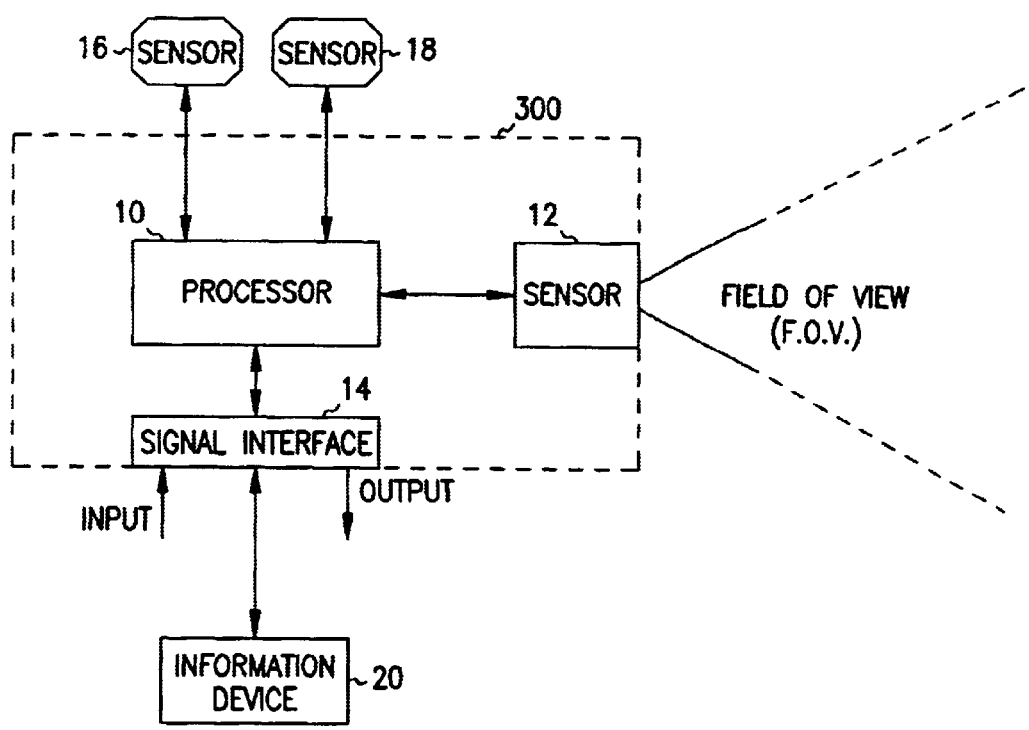
FIG. 3 is a block diagram of an alternate embodiment of a stand alone sensor module according to the teachings of the present invention.

FIG. 3 illustrates a stand alone sensor module 300 with a sensor 12, a signal interface 14, an information device 20 and a processor 10. Processor 10 is connected to sensor 12, signal interface 14 and two additional sensors 16 and 18. In one embodiment, stand alone sensor module 300 is capable of being connected electrically or wirelessly to information device 20. In one embodiment, stand alone sensor module 300 includes a display module. In one embodiment, the display module is a visual display and is mountable on the interior or the exterior of the vehicle. In another embodiment, the display module is both visual and audio. In still another embodiment the display module is a visual display mountable on the interior or exterior of a vehicle and includes a remote audio module for mounting on the interior of the vehicle. In another embodiment, the remote audio module is wirelessly connected to the visual display. In a further embodiment, the display module is wirelessly connected to stand alone sensor module 300.

Figure 4:
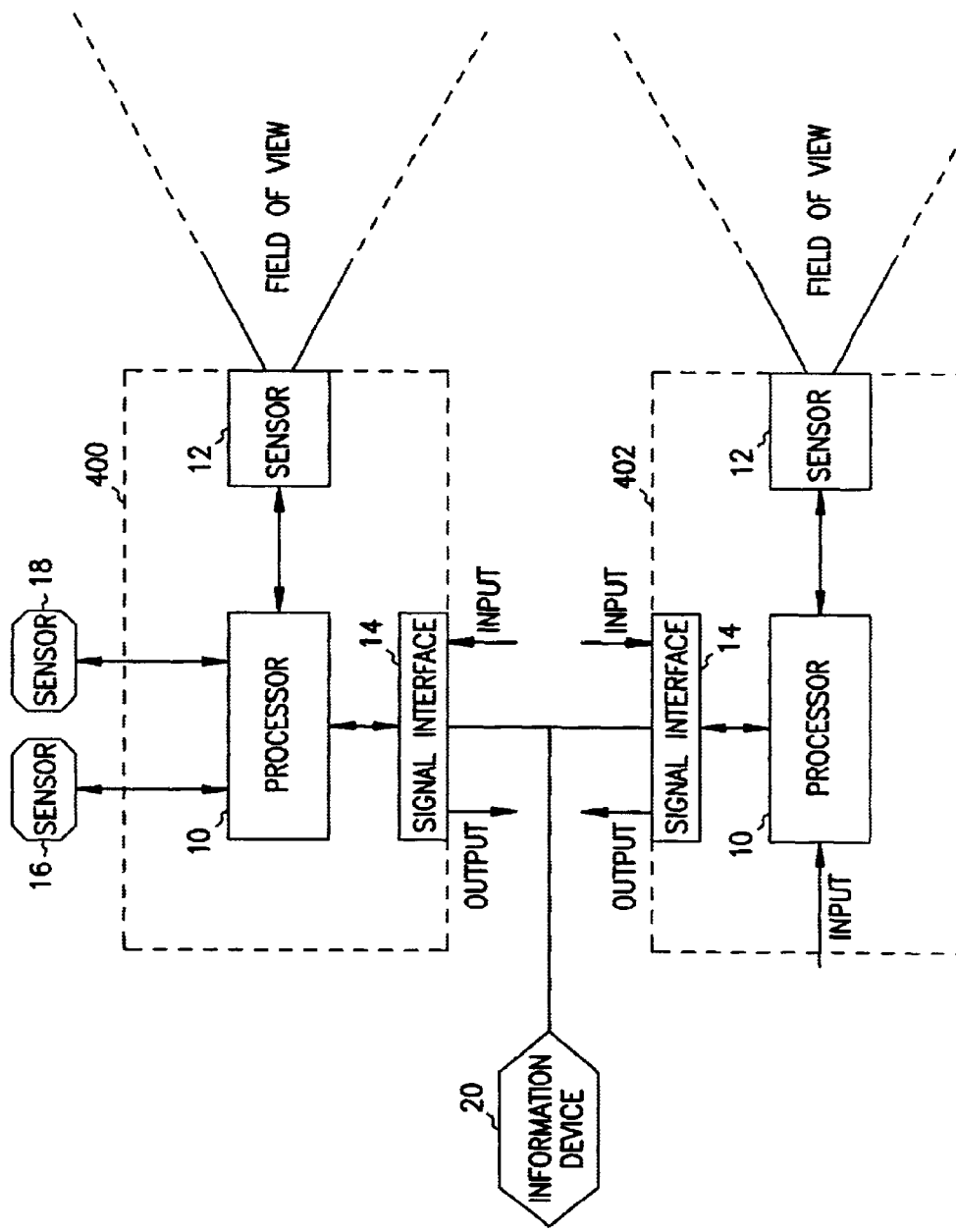
FIG. 4 is a block diagram of one embodiment of an object detection system according to the teachings of the present invention.

FIG. 4 illustrates a stand alone sensor module 400 with a sensor 12, a signal interface 14 and a processor 10. Stand alone sensor module 400 is coupled to another stand alone sensor module 402 that also includes a sensor 12, a signal interface 14 and a processor 10. In addition, stand alone sensor module 400 includes two slave sensors 16 and 18 coupled to processor 10. Stand alone sensor modules 400 and 402 are connected to an information device 20. In this embodiment, the information device 20 is a display module and provides built-in-test information indicating whether or not all of the sensors of stand alone sensor module 400 and stand alone sensor module 402 are functioning and status information determined by processor 10 of stand alone sensor module 400 and processor 10 of stand alone sensor module 402. In one embodiment, the status information includes range data about hazards such as distance and location of a hazard with respect to the host vehicle. Processor 10 also determines the time-to-impact, which is calculated using the distance from the host vehicle to the detected object and the rate at which the host vehicle and the detected object are closing upon each other, or the closing rate. In another embodiment, the status information includes a warning signal for an approaching vehicle to decrease speed, not to pass the host vehicle, to stop or other information to be used by an individual or a device outside the host vehicle. In an another embodiment, stand alone sensor module 402 includes slave sensors coupled to processor 10 that provide additional object detection data to the processor 10. The processor 10 uses all of the data to determine status information to include hazards. In a further embodiment, stand alone sensor module 402 and or 400 are coupled to additional stand alone sensor modules.

In an alternate embodiment, stand alone sensor modules 400 and 402 are coupled to an information device such as a centralized computer system that provides a broad range of vehicle data information to a driver such as engine monitoring, systems checks, security information, trip data, vehicle location such as global positioning and the like. In another embodiment, stand alone sensor modules 400 and 402 are coupled to an information device such as a black box data recorder for accident reconstruction or safety statistic data. In a further embodiment, stand alone sensor modules 400 and 402 are coupled to a satellite system for centralized tracking by trucking companies, bus and train lines and the like. In another embodiment, stand alone sensor modules 400 and 402 are coupled to a display module and a centralized computer system or a black box data recorder or a satellite system or any combination of information devices to include all of these information devices.

Figure 5:
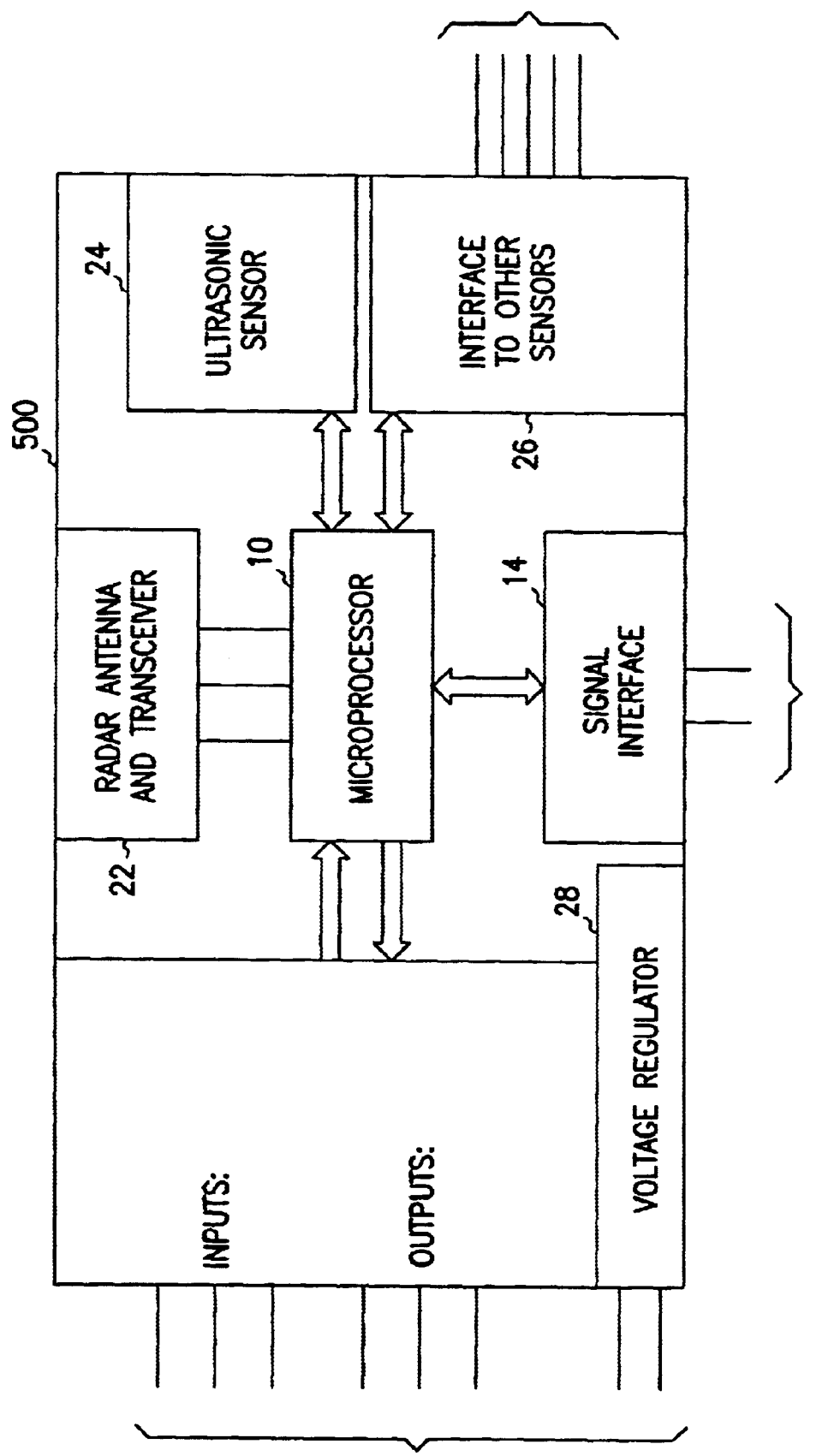
FIG. 5 is a block diagram of one embodiment of a stand alone sensor module according to the teachings of the present invention.

FIG. 5 is a block diagram of one embodiment of a stand alone sensor module indicated generally at 500 according to the present invention. Stand alone sensor module 500 includes a processor 10 coupled to a radar sensor 22, an ultrasonic sensor 24, a signal interface 14, a sensor interface 26 and a number of inputs and outputs. Processor 10 receives inputs that include vehicle condition inputs and signal data. In one embodiment, processor 10 receives vehicle input signals through signal interface 14. A stand alone sensor module with a signal interface 14, a sensor interface 26 and inputs and outputs allows for maximum flexibility and interconnection with many types of vehicles, trailers, sensors and information devices. In one embodiment, stand alone sensor module 500 is used with any variety of vehicles having any number of communication interfaces. In another embodiment, stand alone sensor module 500 is used with one information device or a plurality of information devices. Processor 10 communicates directly with radar sensor 22 and ultrasonic sensor 24 and communicates to other sensors through sensor interface 26. The other sensors include stand alone sensor modules, slave sensors or a combination of stand alone sensor modules and slave sensors. Stand alone sensor module 500 provides vehicle status outputs to any number of information devices. In one embodiment, stand alone sensor module 500 includes voltage regulator 28.

Stand alone sensor modules 100, 200, 300, 400 and 500 discussed with respect to FIGS. 1–5 can be used for a variety of applications. These applications include single chassis vehicles such as trucks, buses, motor homes and the like, multiple chassis vehicles to include tractor trailer rigs, vehicles towing trailers, trains and the like. Applications also include stationary locations such as work zone areas. The stand alone sensor modules are flexible and capable of object detection to include forward looking detection, rear and side detection, under wheel detection, vehicle clearance data and the like. In one embodiment, the stand alone sensor modules are portable and transportable from one location to another such as for use with a variety of trailers by an independent truck driver. In one embodiment, the portable stand alone sensor module includes at least one slave sensor and a display module.

Figure 6:
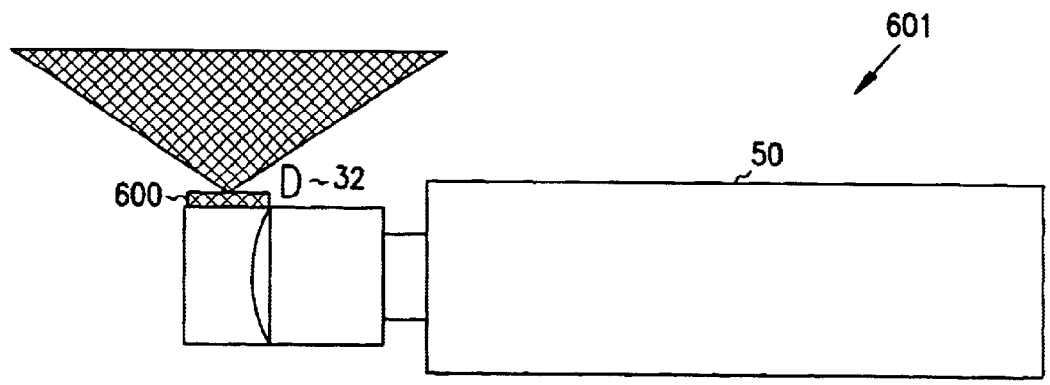
FIG. 6 is an illustration of one application of a stand alone sensor module according to the teachings of the present invention.

FIG. 6 is an illustration of one application of a stand alone sensor module 600 indicated generally at 601. In this embodiment, stand alone sensor module 600 is used for side object detection on a vehicle 50. Stand alone sensor module 600 provides status information via a display module 32. It is under stood that vehicle 50 includes any variety of vehicles such as a single chassis vehicle, a tractor trailer rig, a bus, a motor home, a train, a car, a camper and the like. Stand alone sensor module 600 provides side object detection within its field-of-view. In this embodiment, display module 32 is mounted on the side view mirror. It is understood that display module 32 includes any display visible or audible to the driver within the interior of the vehicle or mounted on the exterior of the vehicle. In an alternate embodiment, the display module is mounted on the vehicle so as to be visible or audible to an individual, a vehicle, an electronic system or the like outside of the vehicle. The display 32 provides a warning signal to include flashing lights, an audio signal, flashing lights and an audio signal, a sign, a mechanical device such as a flag and the like. Stand alone sensor module 600 is shown on the right side of the vehicle and in an alternate embodiment is employed on the left side of the vehicle and in a further embodiment there are two stand alone sensor modules one employed on the left and one on the right side of the vehicle. In an alternate embodiment, the stand alone sensor module includes slave sensors for additional object detection.

Figure 7:
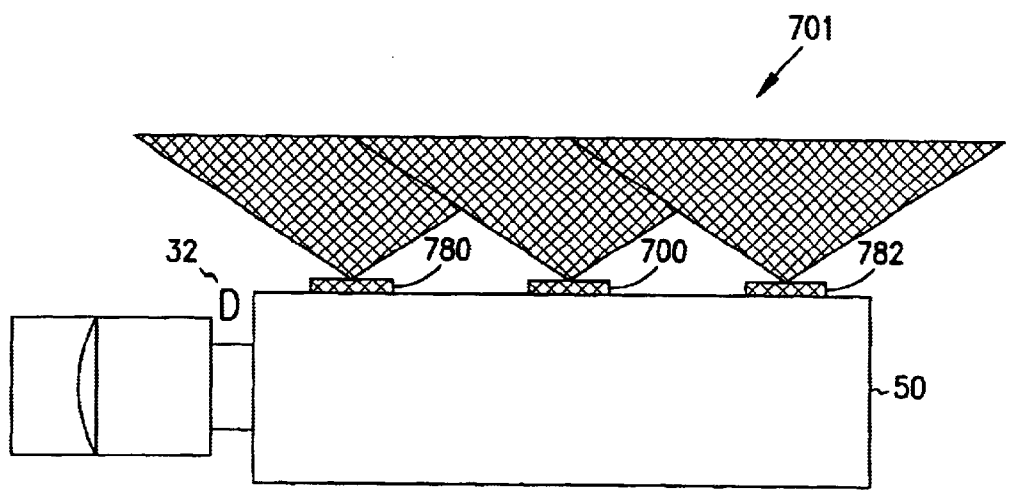
FIG. 7 is an illustration of one application of an object detection system according to the teachings of the present invention.

FIG. 7 is an illustration of one application of an object detection system employed on a vehicle indicated generally at 701. In this embodiment, the object detection system includes three sensors 700, 780 and 782. In one embodiment, sensor 700 is a stand alone sensor module and sensors 780 and 782 are slave sensors. In an alternate embodiment, sensors 700, 780 and 782 are all stand alone sensor modules. In another embodiment, sensor 700 is a stand alone sensor module and one of sensors 780 and 782 is a stand alone sensor module and the other sensor is a slave sensor. The object detection system provides status information via display module 32. In this embodiment, display module 32 is mounted on the vehicle or trailer and is viewed by the driver through the side view mirror. It is understood that display module 32 includes any display visible or audible to the driver within the interior of the vehicle or mounted on the exterior of the vehicle. The object detection system 701 provides side object detection within the field-of-view of sensors 700, 780 and 782. Signal data is transmitted from the sensors 700, 780 and 782 to display module 32. Stand alone sensor module 700 is shown on the right side of the vehicle and in an alternate embodiment is employed on the left side of the vehicle and in a further embodiment there are two stand alone sensor modules one employed on the left and one on the right side of the vehicle.

Figure 8:
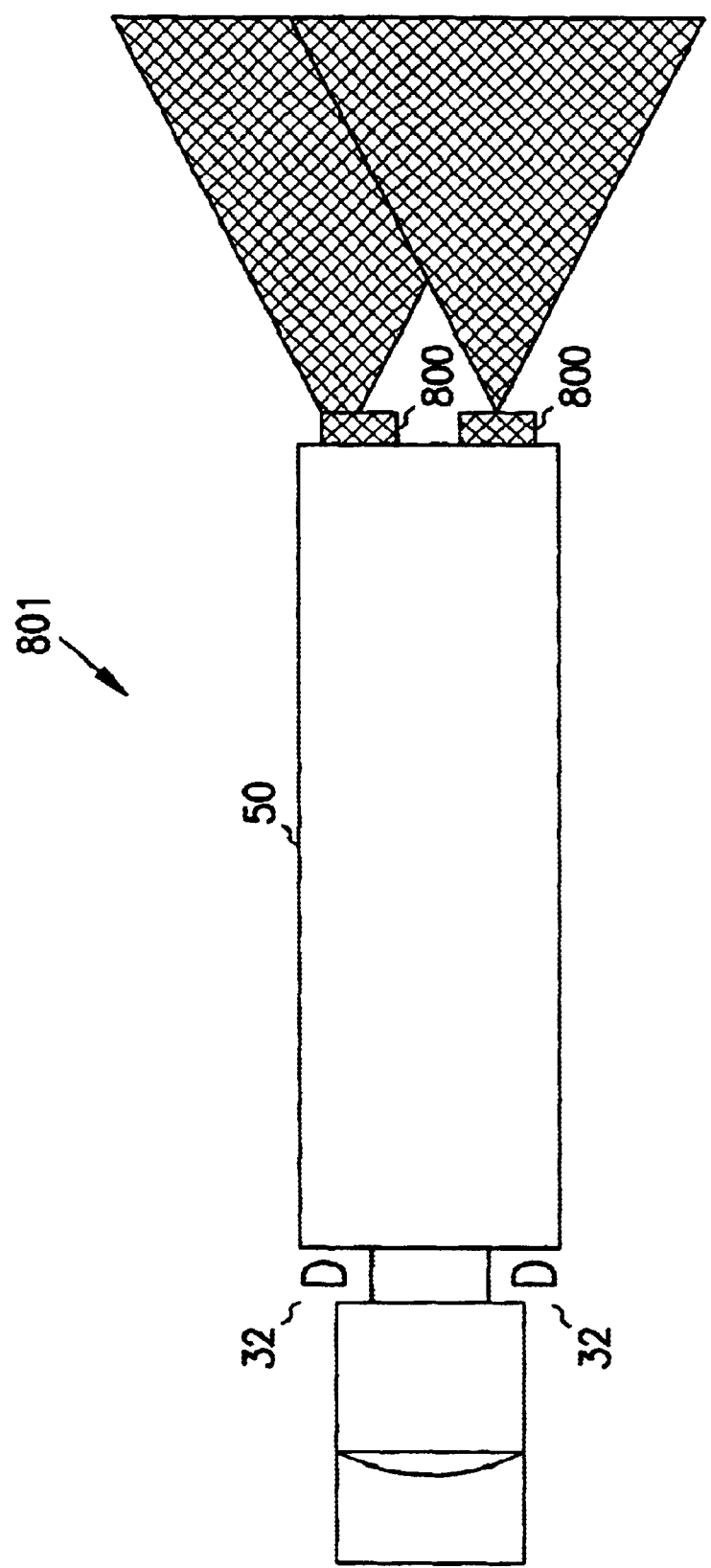
FIG. 8 is an illustration of another application of an object detection system according to the teachings of the present invention.

FIG. 8 is an illustration of one application of an object detection system employed on a vehicle 50 indicated generally at 801. The collision avoidance system includes two stand alone sensor modules 800 and two display modules 32 and provides rear object detection. Each display module 32 includes substantially identical rear object detection information and is mounted on the trailer portion of vehicle 50. It is understood that display module 32 includes any display visible or audible to the driver within the interior of the vehicle or mounted on the exterior of the vehicle. Object detection system 801 provides rear object detection within the FOV of sensors 800. Signal data is transmitted from sensors 800 to display modules 32. In an alternate embodiment, stand alone sensor modules 800 each include at least one slave sensor.

Figure 9:
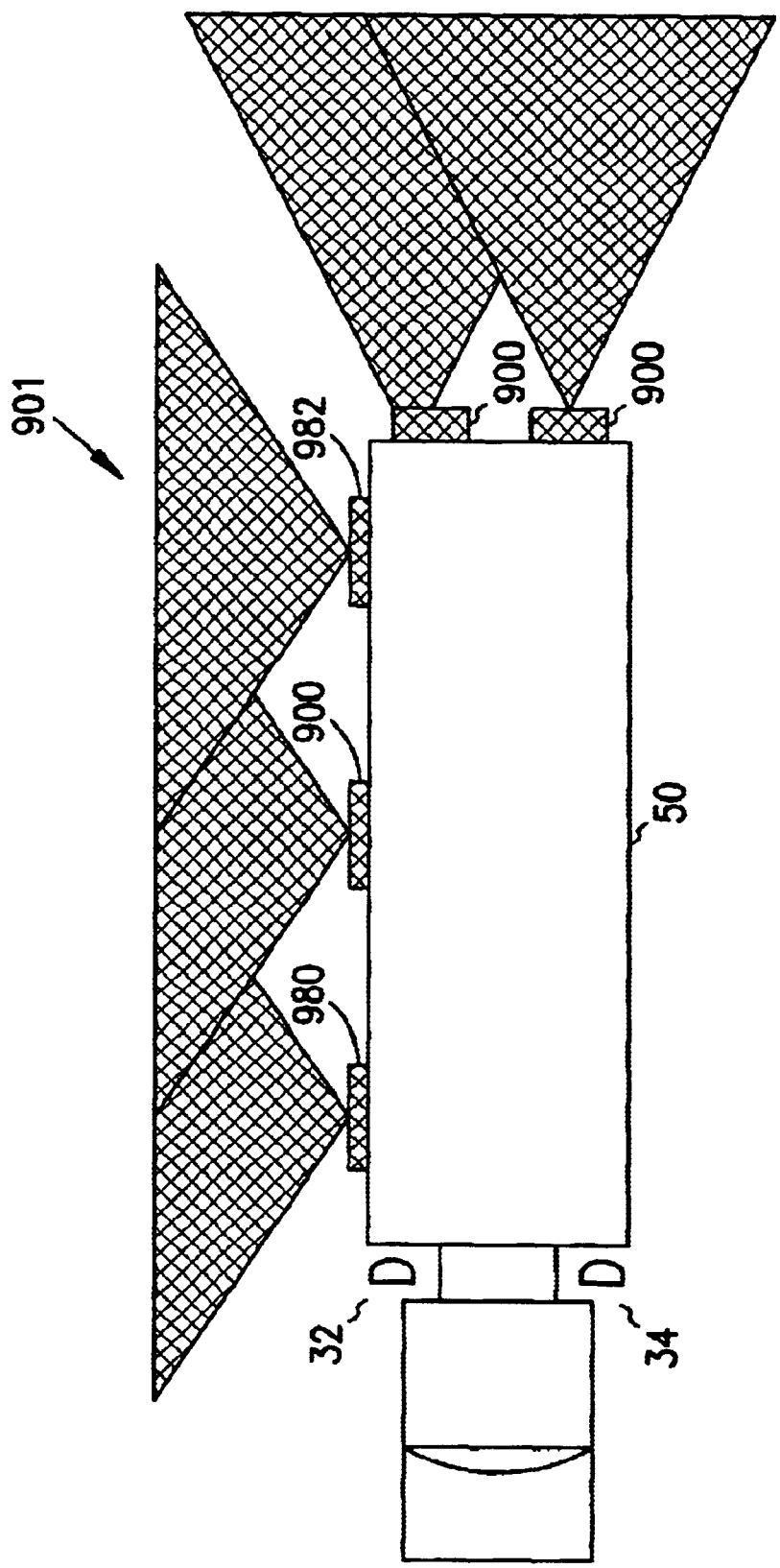
FIG. 9 is an illustration of another application of an object detection system according to the teachings of the present invention.

FIG. 9 is an illustration of one application of an object detection system employed on a vehicle 50 indicated generally at 901. The object detection system 901 includes three stand alone sensor modules 900, two slave sensors 980 and 982 and two display modules 32 and 34. Object detection system 901 provides rear and side object detection within the FOV of sensors 900, 980 and 982. Signal data is transmitted from sensors 900, 980 and 982 to display modules 32 and 34. In this embodiment, display module 34 displays rear object detection information and display module 32 displays both rear and side object detection information. In another embodiment, display module 34 and 32 include substantially identical rear and side object detection information. In an alternate embodiment, collision avoidance system 901 includes only one display unit that displays both rear and side object detection information. It is understood that display modules 32 and 34 include any displays visible or audible to the driver within the interior of the vehicle or mounted on the exterior of the vehicle. In an alternate embodiment, both slave sensors 980 and 982 or one of slave sensors 980 and 982 are replaced with stand alone sensor modules.

Figure 10:
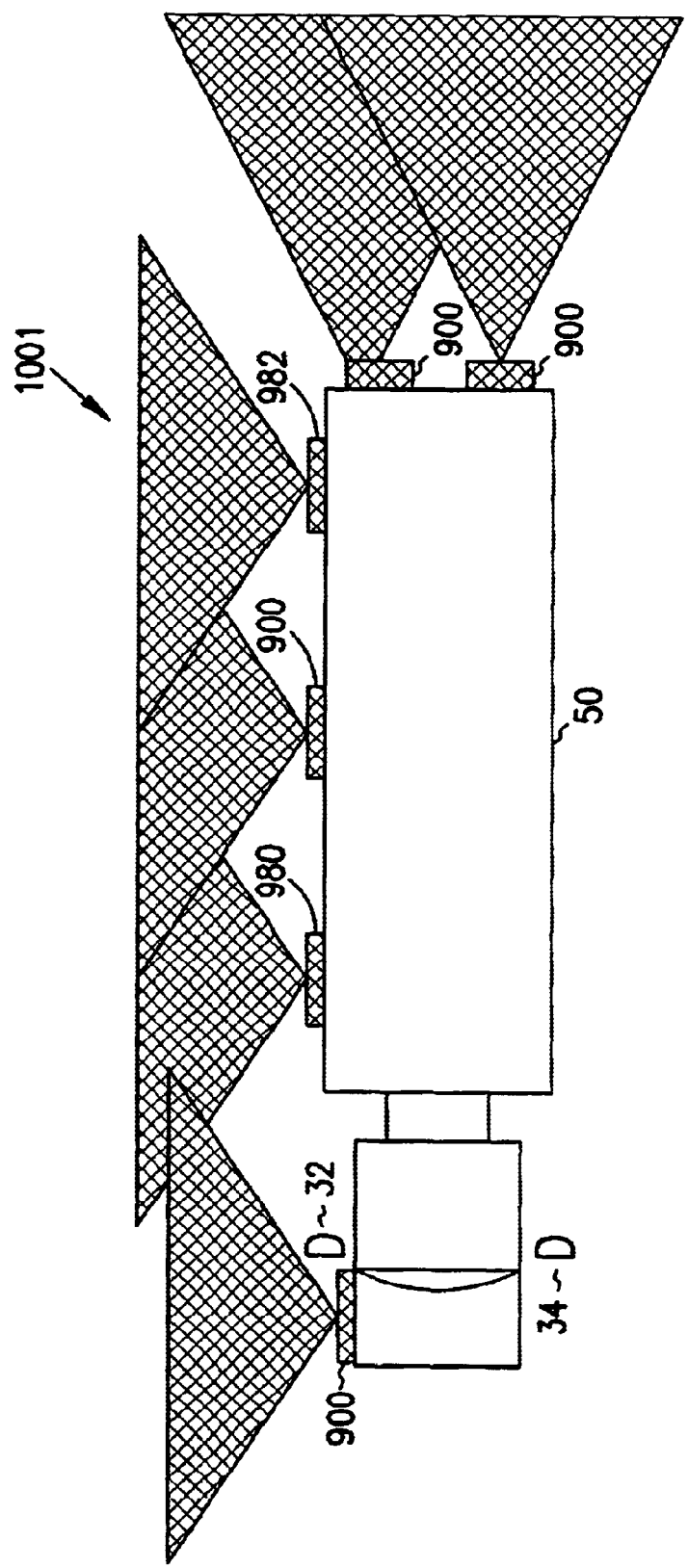
FIG. 10 is an illustration of another application of an object detection system according to the teachings of the present invention.

In an alternate embodiment as illustrated by FIG. 10, additional sensors whether stand alone sensor or slave modules are added to the object detection system 901 now shown as object detection system 1001. In this embodiment, display modules 32 and 34 are on the cab of the vehicle.

Figure 11:
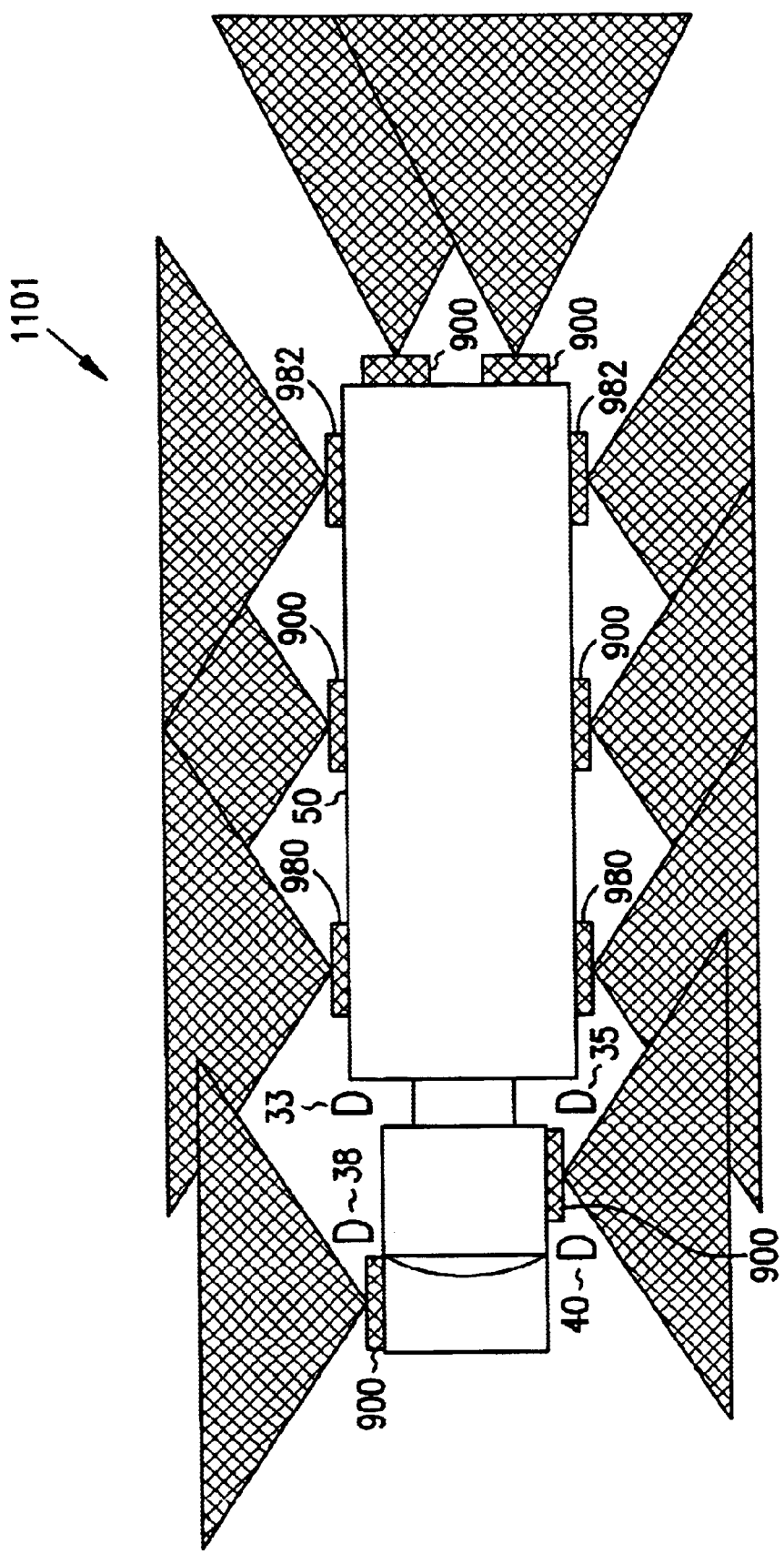
FIG. 11 is an illustration of yet another application of an object detection system according to the teachings of the present invention.
Figure 12:
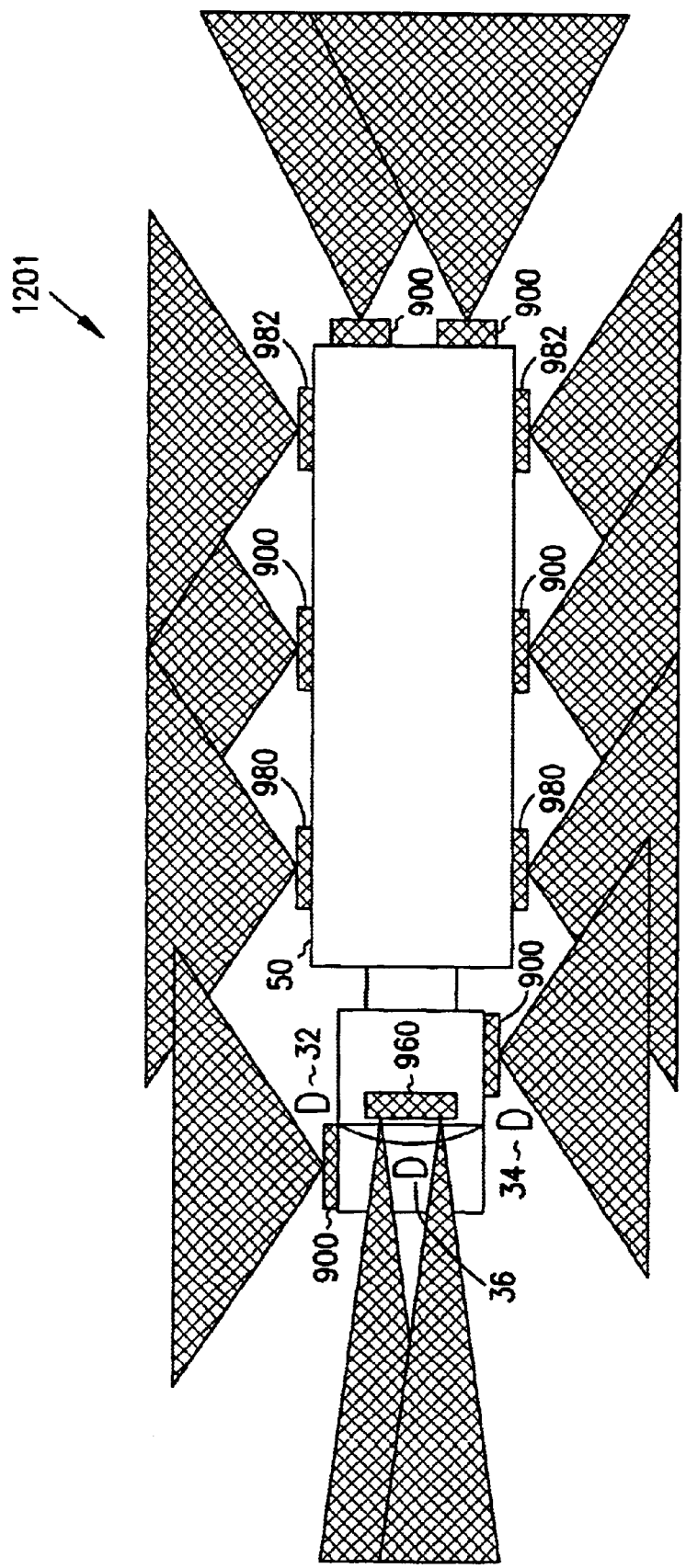
FIG. 12 is an illustration of still another application of an object detection system according to the teachings of the present invention.

The object detection system described in FIGS. 9 and 10 above can be scaled up as shown in illustrations FIG. 11 and FIG. 12. FIG. 11 illustrates an object detection or collision avoidance system indicated generally at 1101 with left and right side objection detection and rear object detection using stand alone sensor modules 900 and slave sensors 980 and 982 within the field-of-view of stand alone sensor modules 900 and slave sensors 980 and 982. In this embodiment, display module 33 displays right side object detection information and rear object detection information and display module 35 displays left side object detection information and rear object detection information. In an alternate embodiment, display module 33 displays right side object detection and display module 35 displays left side object detection. Display module 38 displays front right side object detection and display module 40 displays front left side object detection. In an alternate embodiment, display modules 38 and 40 include rear object detection. It is understood that object detection information received from stand alone sensor modules 900 and slaves sensors 980 and 982 can be displayed in a variety of ways to include a monitor coupled to the output of the sensor displaying the object detection locations, display modules for selected areas about the vehicle to include right, left, side, rear, front and the like, and warning signals to include audio and visual signals within the cab and outside of the vehicle.

FIG. 12 is an alternate embodiment of an object detection systems indicated generally at 1201. The object detection system includes an additional sensor 960 located on the top of the vehicle that provides long range forward looking detection as described in application Ser. No. 09/130,279, filed on Aug. 6, 1998, entitled "System and Method of Avoiding Collisions" by inventors Richard A. Gunderson, et. al. Display module 32 displays right side and rear object detection, display module 34 displays left side and rear object detection and display module 36 is mounted within the cab of the vehicle displays forward object detection. It is understood that object detection information received from stand alone sensor modules 900, slaves sensors 980 and 982 and sensor 960 can be displayed in a variety of ways to include a monitor coupled to the output of the sensor displaying the object detection locations, display modules for selected areas about the vehicle to include right, left, side, rear, front and the like, and warning signals to include audio and visual signals within the cab and outside of the vehicle.

Figure 13:
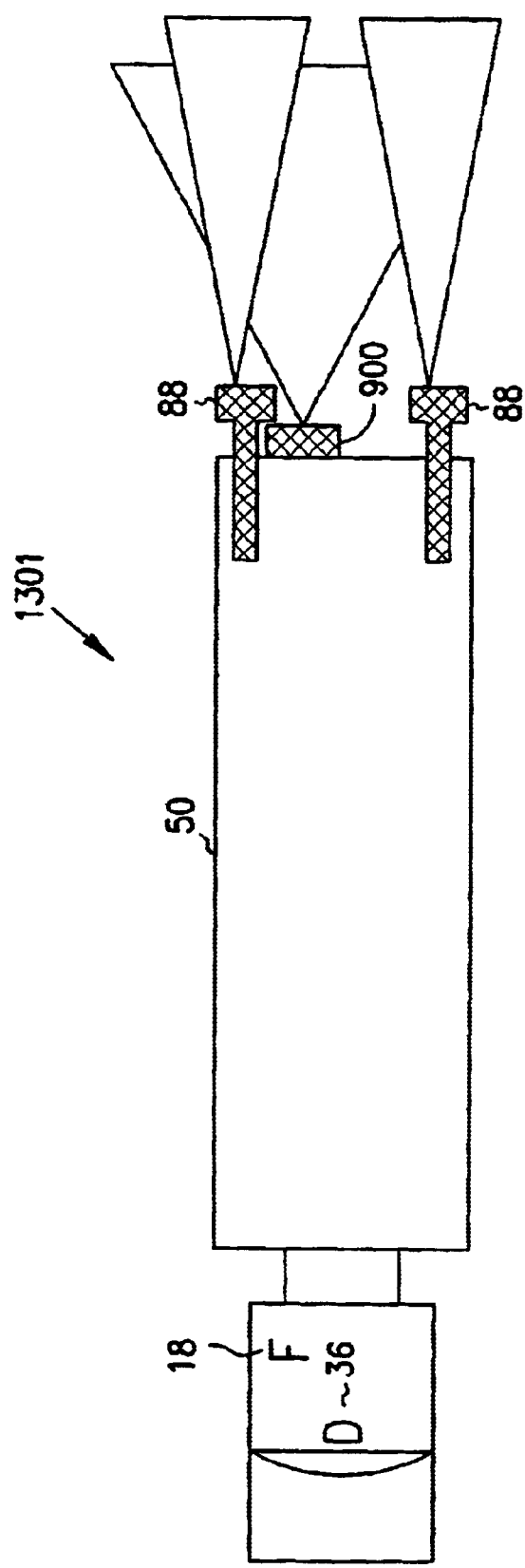
FIG. 13 is an illustration of one application of stand alone sensor module according to the teachings of the present invention.

FIG. 13 is an illustration of one application of an object detection system employed on a vehicle 50 indicated generally at 1301. Object detection system 1301 includes stand alone sensor module 900 that provides rear object detection within its FOV. Display module 36 is mounted within the cab of the vehicle and displays rear object detection information. In this embodiment, stand alone sensor module 900 determines at what range and/or speeds vehicles are approaching from the rear and if the approaching vehicles present a hazard. In another embodiment, stand alone sensor module 900 determines a hazard condition exists based on range, speeds or time-to-impact of vehicles approaching from the rear. When stand alone sensor module 900 determines a hazard condition exists it provides information to display module 36 and initiates warning flashers 88 to warn the approaching vehicle. In one embodiment, object detection system 1301 includes a flasher power supply 18 to provide power to warning flashers 88. Warning flashers 88 are high intensity lights that will penetrate rain, fog, or snow to warn the approaching driver of the presence of vehicle 50. When the approaching vehicle slows down to a non-hazard condition the stand alone sensor module 900 will automatically turn off the warning flashers 88.

Figure 14:
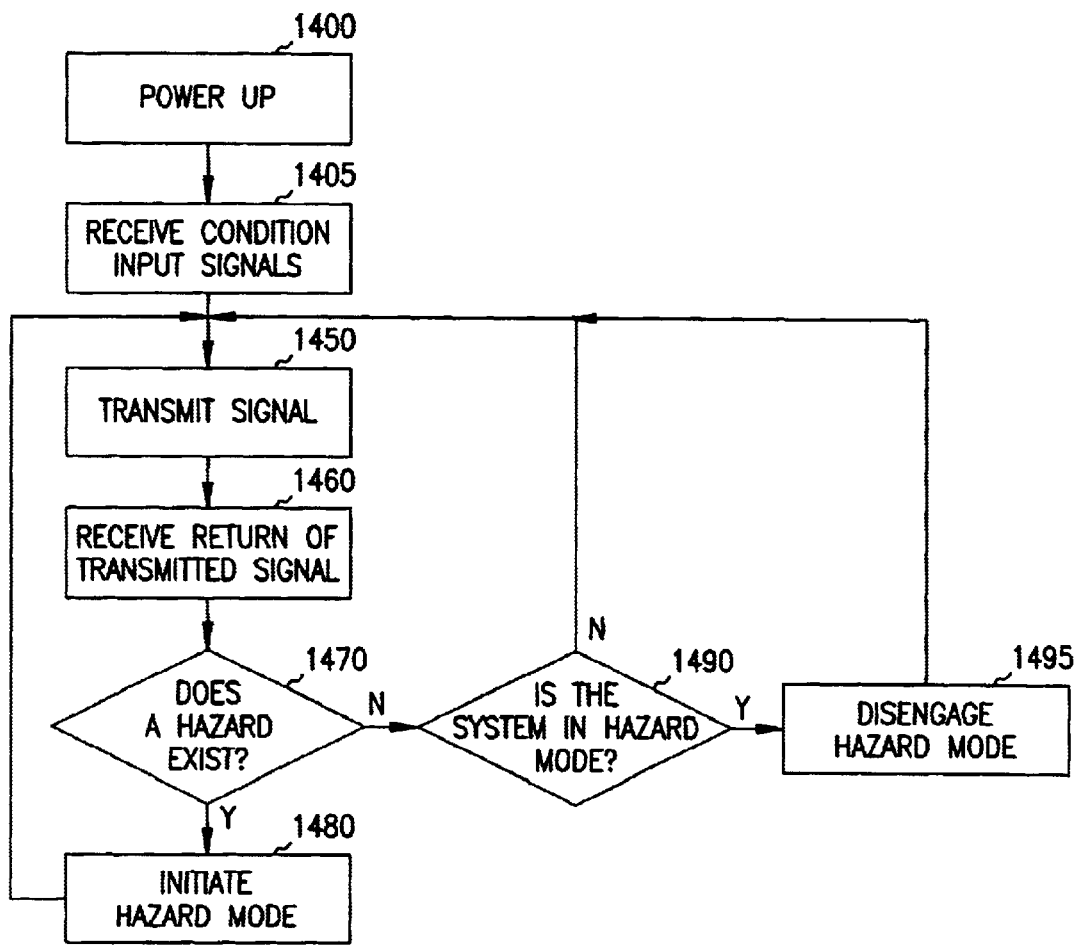
FIG. 14 is a block diagram of a method of object detection with a stand alone sensor module according to the teachings of the present invention.

FIG. 14 is one embodiment of a method of detecting an object with a stand alone sensor module. The method begins with block 1400 once the stand alone sensor module is powered up the method proceeds to block 1405. At block 1405 the stand alone sensor module receives condition input signals and then proceeds to block 1450 and the stand alone sensor module transmits a detection signal and receives a return of the transmitted signal at block 1460. The method then proceeds to block 1470 and determines whether a hazard exists based on the return of the transmitted detection signal and the vehicle condition signals. When a hazard exists the method proceeds to block 1480 and initiates a hazard mode by transmitting a vehicle status signal containing hazard data to the information device. When a hazard does not exist the method proceeds to block 1490 and determines if the system is currently in a hazard mode. If the system is in hazard mode and a hazard does not exist the method proceeds to block 1495 and disengages the hazard mode. The method then proceeds back to block 1450 and repeats the method. When a hazard does not exist and the system is not in a hazard mode the method proceeds back to block 1450 and repeats the method.

Figure 15:
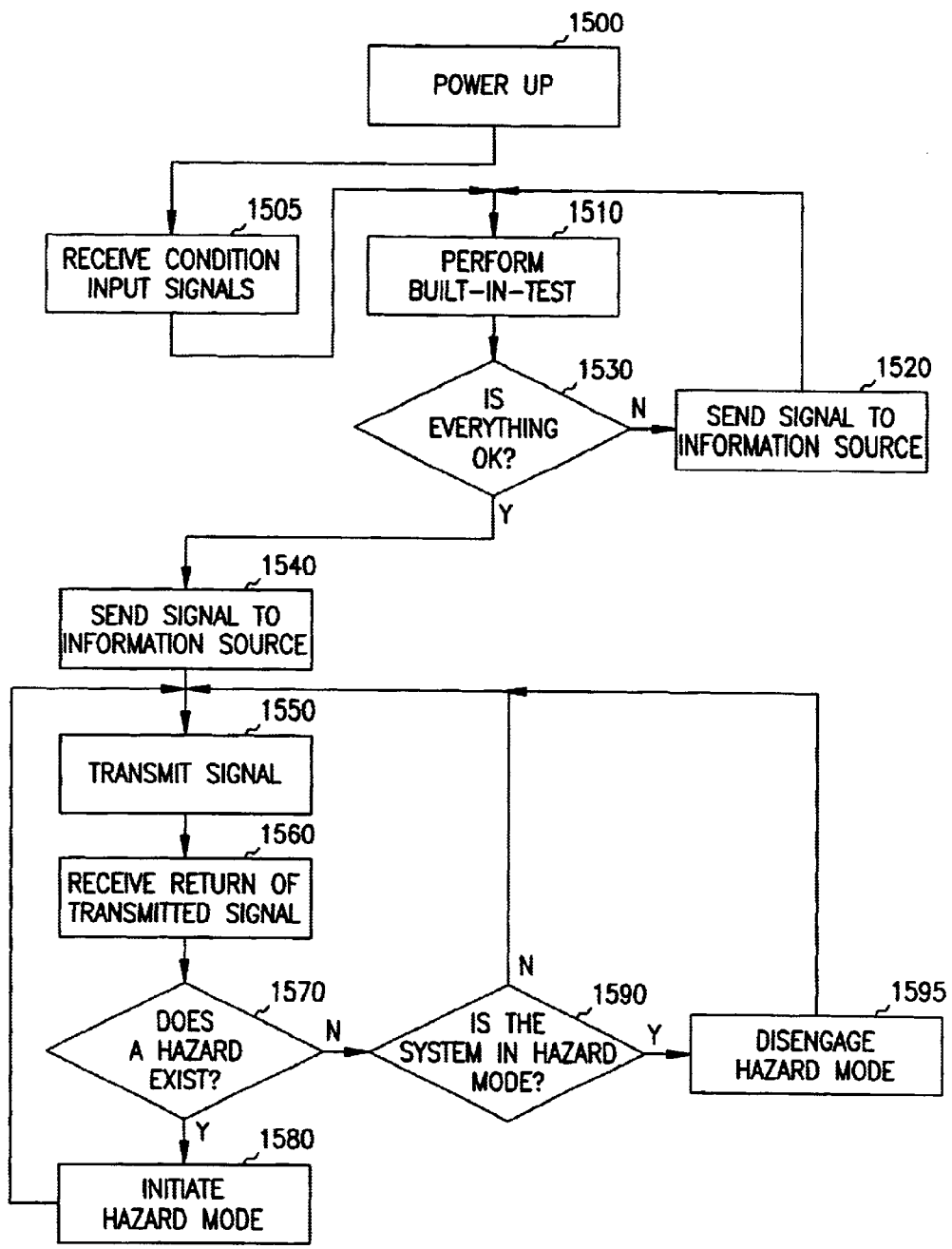
FIG. 15 is a block diagram of another method of object detection with a stand alone sensor module according to the teachings of the present invention.

FIG. 15 is another embodiment of a method of detecting an object with a stand alone sensor module. The method begins with block 1500 once the stand alone sensor module is powered up the method proceeds to block 1505. At block 1505 the stand alone sensor module receives condition input signals and then proceeds to block 1510 where the stand alone sensor module performs a built-in-test. The built-in-test includes a test to determine whether the sensors connected to the stand alone sensor module are functioning. The method proceeds to block 1530 where the stand alone sensor module determines if everything is okay, if the sensors are functioning, if everything is okay the method proceeds to block 1540. If everything is not okay the method proceeds to block 1520 and the stand alone sensor module sends a signal to an information device indicating that the sensors are not functioning. In one embodiment, the stand alone sensor module sends a signal to an information device indicating that the sensors are not functioning and that sensors are not functioning. The method then proceeds to block 1510 to begin method again. When everything is okay and the method proceeds to block 1540 the stand alone sensor module sends a signal to an information device indicating everything is okay. The method then proceeds to block 1550 and the stand alone sensor module transmits a detection signal and receives a return of the transmitted signal at block 1560. The method proceeds to block 1570 and determines whether a hazard exists based on the return of the transmitted detection signal and the vehicle condition signals. When a hazard exists the method proceeds to block 1580 and initiates a hazard mode by transmitting a vehicle status signal containing hazard data to the information device. When a hazard does not exist the method proceeds to block 1590 and determines if the system is currently in a hazard mode. If the system is in hazard mode and a hazard does not exist the method proceeds to block 1595 and disengages the hazard mode. When a hazard does not exist and the system is not in a hazard mode the method proceeds back to block 1550 and repeats the method. It is understood that the stand alone sensor continually transmits and receives signals while processing the data in order to determine whether or not a hazards exists. In another embodiment, the stand alone sensor transmits and receives a signal then processes the signal and then transmits and receives another signal and then processes that signal.

Figure 16:
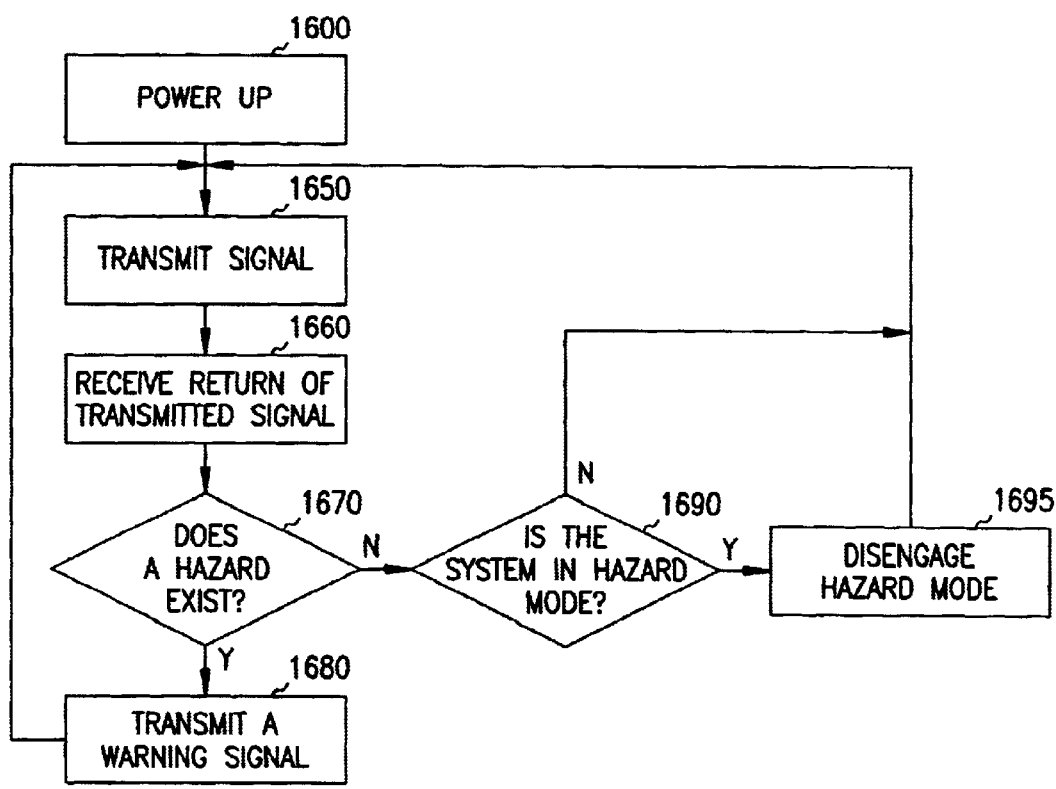
FIG. 16 is a block diagram of yet another method of object detection with a stand alone sensor module according to the teachings of the present invention.

FIG. 16 is another embodiment of a method of detecting an object with a stand alone sensor module. The method is detecting and warning an approaching vehicle. The method begins with block 1600 once the stand alone sensor module is powered up the method proceeds to block 1650. At block 1650 and the stand alone sensor module transmits a detection signal and receives a return of the transmitted signal at block 1660. The method proceeds to block 1670 and determines whether a hazard exists based on the return of the transmitted detection signal. When a hazard exists the method proceeds to block 1680 and initiates a hazard mode by transmitting a warning signal. When a hazard does not exist the method proceeds to block 1690 and determines if the system is currently in a hazard mode. If the system is in hazard mode and a hazard does not exist the method proceeds to block 1695 and disengages the hazard mode. When a hazard does not exist and the system is not in a hazard mode the method proceeds back to block 1650 and repeats the method. It is understood that the stand alone sensor continually transmits and receives signals while processing the data in order to determine whether or not a hazards exists. In another embodiment, the stand alone sensor transmits and receives a signal then processes the signal and then transmits and receives another signal and then processes that signal.

Figure 17:
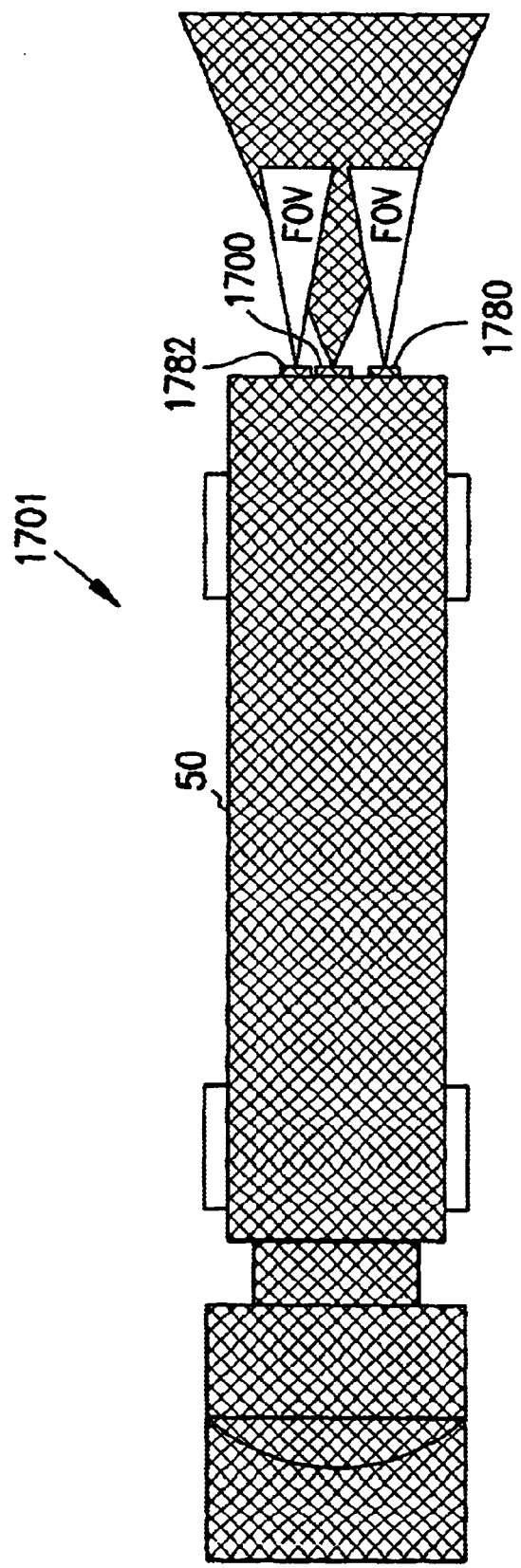
FIG. 17 is an illustration of another application of an object detection system according to the teachings of the present invention.

FIG. 17 is an illustration of one application of an object detection system employed on a vehicle 50 indicated generally at 1701. Object detection system 1701 includes stand alone sensor module 1700 that provides rear object detection within its FOV. In this embodiment, stand alone sensor module 1700 is employing a radar sensor, which detects object at long range, and is connected to two slave sensors 1780 and 1782. Slave sensors 1780 and 1782 are employing ultrasonic sensor technology and detect object within a close range of up to approximately 20 feet. The combination of radar and ultrasonic sensors creates an extended FOV for hazard detection and provides accurate rate and range data for detected objects to include moving vehicles. It is understood that stand alone sensor module 1700 and slave sensors 1780 and 1782 are not restricted to the ultrasonic and radar sensor technology respectively. Any combination of sensors and sensor technologies are capable of being configured to accommodate many applications for a variety of users from recreation to professional drivers. For example, in one embodiment, stand alone sensor module 1700 employ ultrasonic sensor technology and slave sensors 1780 and 1782 employ radar technology. As described previously, the sensor technology is not limited to ultrasonic and radar detection technologies and may include any variety of detection technologies such as photoelectric, video, laser, ladar and/or infrared. In addition object detection 1701 includes a display module not shown which is mounted within view or hearing of the driver of vehicle 50.

Figure 18:
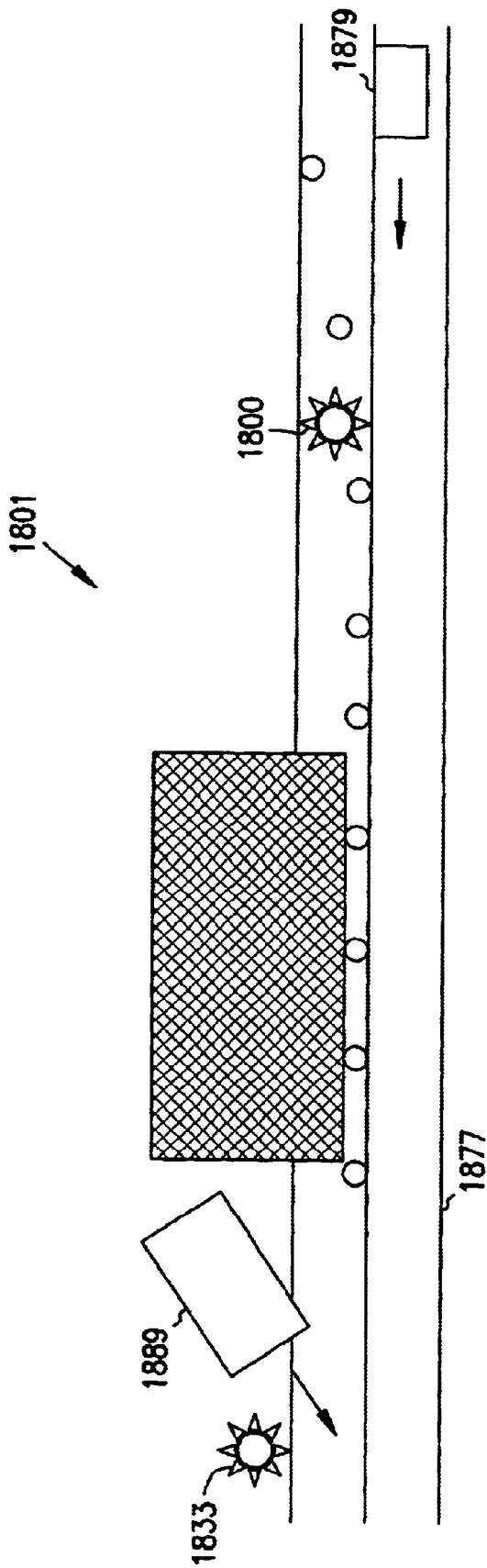
FIG. 18 is an illustration of another application of an object detection system according to the teachings of the present invention.

FIG. 18 is an illustration of an object detection system employed within a work zone area shown generally at 1801. Object detection system includes stand alone sensor modules 1800 and 1833. Stand alone sensor module 1800 detects the presence and speed of an on coming vehicle 1879. Stand alone sensor module 1833 detects the presence and speed of a vehicle 1889 entering the roadway 1877 and transmits a signal to stand alone sensor module 1800 indicating the detection of vehicle 1889 and speed. Stand alone sensor module 1800 receives the signal and determines that the speed of the approaching vehicle 1879 is too fast considering that vehicle 1889 will be entering the roadway ahead. As a result, stand alone sensor module 1800 determines that a hazard condition exists and activates one or more warning lights or signs (not shown) to alert vehicle 1879 of the hazard condition. In one embodiment, stand alone sensor module 1800 directs vehicle 1879 to stop or slow down to a predetermined speed. In another embodiment, stand alone sensor module 1800 transmits a signal to stand alone sensor module 1879 which in turn activates one or more warning lights or signs to alert vehicle 1889 of the hazard condition. In a further embodiment, stand alone sensor module 1800 activates one or more warning lights or signs to alert vehicle 1879 of the hazard condition and transmits a signal to stand alone sensor module 1833 which in turn actives one or more warning lights or signs to alert vehicle 1889 of the hazard condition. In alternate embodiments, additional sensors within the work zone are employed which receive and transmit signals to and from stand alone sensor modules 1800 and 1833 to warn vehicles or individuals within the work zone of a hazard condition. In a further embodiment, sensors located within the work zone area detect the presence or absence of workers and transmit signals to stand alone sensor modules 1800 and/or 1833 which in turn adjusts the warning to vehicles approaching the work zone or the road way. For example when a sensor within the work zone detects the presence of workers, it transmits a signal to stand alone sensor module 1800 which in turn provides a warning signal reducing the speed limit while workers are in the work zone.

It is understood that an information device includes any device or devices such as display modules, centralized computer systems, data recorders or "black box", satellite tracking systems and/or a warning systems.

It is also understood that processor 10 of a stand alone sensor module includes any microprocessor or central processing unit containing the basic arithmetic, logic and control element for processing data. In one embodiment, processor 10 is a programmable microcontroller. In another embodiment, the programmable microcontroller is field upgradable for complete peripheral object detection about a vehicle or area to be monitored. In a further embodiment, the programmable microcontroller is compatible for operation with a centralized computer system.

In one embodiment, determining when a hazard exists includes detecting an object in a predetermined range. In another embodiment, determining when a hazard exists includes determining the distance to the detected object and providing a signal to the information device based on the distance to the object.

In one embodiment, performing a built-in-test includes determining whether sensors connected to the stand alone sensor are functioning. In another embodiment, performing a built-in-test includes determining whether all systems connected to the stand alone sensor module are functioning.

In one embodiment, a stand alone sensor module is portable and used for object detection at any number of locations about a vehicle to include the rear of a vehicle while backing or moving forward, the wheel area, the sides of a vehicle, the top of a vehicle (clearance), in front of a vehicle and the like. In alternate embodiments, the stand alone sensor module is portable and includes a display module. In an alternate embodiment, the stand alone sensor module with a display include slave sensors coupled to the stand alone sensor module for additional object detection.

In one embodiment, a stand alone sensor module is scalable up to a collision avoidance system that provides full object detection about the periphery of a vehicle. In another embodiment, the collision avoidance system operates with a central computer fusing all data received from multiple sensors and providing vehicle status information.

In one embodiment, the stand alone sensor module receives signals from sensors and vehicle condition inputs and determines whether or not a hazard condition exists, such as the host vehicle has engaged the left directional and there is an object within the field of view of a side sensor that is within the path that the host vehicle is moving. In another embodiment, the processor receives signals containing range data and determines that not only is their an object within the field-of-view but it is within a first range i.e. 25 feet, a second range i.e. 15 feet, a third range and a fourth range and transmits this to an information device in order to warn the driver.

In an alternate embodiment, the stand alone sensor module determines that a hazard exists and the module initiates cautionary measures such as warning signs or signals, applying the vehicle's brakes, setting off an alarm system, not allowing the vehicle to move out of park and the like.

In one embodiment, the stand alone sensor module determines that the host vehicle is slowing down and activates rear brake lights on the vehicle or a trailer. In one embodiment, the stand alone sensor module includes lights that can be mounted on the vehicle or trailer to indicate slowing down, braking or a hazard exists.

In another embodiment, the processor receives signals containing range and speed data of an object to include another vehicle in relation to the host vehicle. In the situation where a snow plow is clearing snow and a vehicle is approaching the snow plow too quickly and the sensor receives data signals transmits them to the processor that determines that the approaching vehicle is proceeding too fast and the processor engages a hazard light to warn the approaching vehicle. The hazard light includes a sign, a high power light, a high power light system and/or some other indication to the approaching vehicle. In an alternate embodiment, a stand alone sensor module with or without slave sensors is employed in a work zone to warn approaching vehicles that they are entering a work zone, to slow down or to stop. The system employs a warning system to include a hazard light, a warning sign, mechanical or electrical, and/or some other indication to warn an approaching vehicle.

Conclusion

An object detection system has been described. The object detection system includes a stand alone sensor module that detects object about a vehicle or a stationary location. The stand alone sensor module includes a processor connected to a sensor and a signal interface. The processor receives signals from the sensor and the signal interface and drives a hazard status signal as a function of the signals received from the sensor and the signal interface.

In another embodiment, a stand alone sensor module comprising a sensor connected to a processor has been described. The processor includes a signal interface and receives signals from the sensor and the signal interface. The processor generates a vehicle status signal as a function of the signals received from the sensor and the signal interface and drives the vehicle status signal to the signal interface.

Further, according to an alternate embodiment, a collision avoidance system has been described. The collision avoidance system includes a first stand alone sensor module connected to a second stand alone sensor module and a display module coupled to both the first and second sensor modules. The first stand alone sensor module includes a first sensor coupled to a first processor. The first processor is connected to a first signal interface. The first processor receives signals from the first sensor and the first signal interface and drives a first vehicle status signal to the first signal interface as a function of the signals received from the first sensor and first signal interface. The second stand alone sensor module includes a second sensor coupled to a second processor. The second processor is connected to a second signal interface. The second processor receives signals from the second sensor and the second signal interface and drives a second vehicle status signal to the second signal interface as a function of the signals received from the second sensor and second signal interface. The display module receives the first and second vehicle status signals and displays vehicle status information representative of the first and second vehicle status signals.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is intended that this invention be limited only by the claims and the equivalents thereof

What is claimed is:

1. A collision avoidance system, comprising:
   a first stand alone sensor module comprising:
      a first sensor adapted to wirelessly detect an object within a first field of view;
      a first vehicle condition input;
      a first signal interface having a first output;
      a first processor connected to the first sensor, the first signal interface, and the first vehicle condition input, wherein the first processor receives a first sensor signal from the first sensor and a first vehicle condition signal from the first vehicle condition input and transmits a first status signal using the first signal interface, the first status signal generated based on the first sensor signal and the first vehicle condition signal; and
   a second stand alone sensor module coupled to the first stand alone sensor module comprising:
      a second sensor adapted to wirelessly detect an object within a second field of view;
      a second vehicle condition input;
      a second signal interface having a second output;
      a second processor connected to the second sensor, the second signal interface, and the second vehicle condition input, wherein the second processor receives a second sensor signal from the second sensor and a second vehicle condition signal from the second vehicle condition input and transmits a second status signal using the second signal interface, the second status signal generated based on the second sensor signal and the second vehicle condition signal; and
   a display module coupled to the first output and the second output and adapted for displaying information representative of the first status signal and the second status signal.

2. The collision avoidance system of claim 1, wherein the second stand alone sensor module is wirelessly coupled to the first stand alone sensor module.

3. The collision avoidance system of claim 1, wherein the first signal interface is coupled to a first data bus, the first data bus adapted for transmitting the first status signal.

4. The collision avoidance system of claim 3, wherein the second signal interface is coupled to a second data bus, the second data bus adapted for transmitting the second status signal.

5. The collision avoidance system of claim 3, wherein the first sensor includes an ultrasonic sensor, a radar sensor, a ladar sensor, a video sensor, an infrared sensor, or a photoelectric sensor.

6. The collision avoidance system of claim 3, wherein the first data bus is communicatively coupled to the second data bus.

7. The collision avoidance system of claim 3, wherein the second signal interface is coupled to the first data bus for receiving second vehicle condition information.

8. The collision avoidance system of claim 1, wherein the first signal interface includes a first slave sensor input for receiving a first slave signal from a first slave sensor.

9. The collision avoidance system of claim 8, wherein the second signal interface includes a second slave sensor input for receiving a second slave signal from a second slave sensor.

10. The collision avoidance system of claim 1, wherein the first stand alone sensor module includes one or more first slave sensors, each of the one or more first slave sensors coupled to the first processor, and wherein the second stand alone sensor module includes one or more second slave sensors, each of the one or more second slave sensors coupled to the second processor, and further wherein each slave sensor is selected from the group including an ultrasonic sensor, a radar sensor, a ladar sensor, a video sensor, an infrared sensor, and a photoelectric sensor.

11. The collision avoidance system of claim 1, further comprising a first slave sensor coupled to the first processor and adapted to provide a first slave signal and further wherein the first status signal is based on the first slave signal.

12. The collision avoidance system of claim 11, further comprising a second slave sensor coupled to the second processor and adapted to provide a second slave signal and further wherein the second status signal is based on the second slave signal.

13. The collision avoidance system of claim 12, wherein the second slave sensor includes an ultrasonic sensor, a radar sensor, a ladar sensor, a video sensor, an infrared sensor, or a photoelectric sensor.

14. A method comprising:
receiving a vehicle condition signal at a portable module, the portable module having a housing with a sensor, a processor, and a signal interface coupled to the housing;
wirelessly transmitting a detection signal from the module;
receiving a return of the transmitted detection signal;
generating a status signal based on the return and the vehicle condition signal wherein generating the status signal includes determining a time-to-impact for a detected object;
transmitting the status signal from the module to a remote device; and
determining a distance and closing rate to the object.

15. A method of detecting an object with a stand alone sensor module, including:
receiving vehicle condition signals;
performing a built-in-test;
sending a first signal to an information device, when a failure is detected in the built-in-test;
sending a second signal to the information device, when no failure is detected in the built-in-test;
transmitting a detection signal;
receiving a return of the transmitted detection signal;
determining whether a hazard exists based on the return of the transmitted detection signal and the vehicle condition signals; and
transmitting a vehicle status signal to the information device.

16. The method of claim 15, wherein performing a built-in-test includes determining whether sensors connected to stand alone sensor module are functioning.

17. A method comprising:
receiving a vehicle condition signal at a portable module, the portable module having a housing with a sensor, a processor, and a signal interface coupled to the housing;
wirelessly transmitting a detection signal from the module;
receiving a return of the transmitted detection signal;
generating a status signal based on the return and the vehicle condition signal wherein generating the status signal includes generating the status signal based on a detected object, generating time-to-impact data based on the return or generating a closing rate based on the return; and
transmitting the status signal from the module to a remote device.

18. A method of detecting an object with a stand alone sensor module, including:
receiving a vehicle condition signal;
performing a built-in-test;
sending a first signal to an information device, when a failure is detected in the built-in-test;
sending a second signal to the information device, when no failure is detected in the built-in-test;
generating image data based on a detected object within a predetermined range;
determining whether a hazard exists based on the image data and the vehicle condition signals; and
transmitting a vehicle status signal to the information device.

19. The method of claim 18 wherein performing a built-in-test includes determining whether sensors connected to stand alone sensor module are functioning.

20. The method of claim 18, wherein performing a built-in-test includes determining whether a processor of the stand alone sensor module is functioning.

* * * * *